United States Patent [19]

Schilling

[11] 4,394,138

[45] Jul. 19, 1983

[54] DIVERGING VORTEX SEPARATOR

[76] Inventor: John R. Schilling, P.O. Box 4191, Woodside, Calif. 94062

[21] Appl. No.: 4,805

[22] Filed: Jan. 19, 1979

[51] Int. Cl.³ ............................................ B01D 45/12
[52] U.S. Cl. ....................................... 55/1; 55/391; 55/396; 55/428; 55/450; 55/452; 55/459 R; 55/460; 210/512.1
[58] Field of Search .................. 55/391, 396, 423, 428, 55/450, 452, 459 R, 459 B, 459 D, 1, 460; 210/512 R; 209/144, 211

[56] References Cited

U.S. PATENT DOCUMENTS

| 1,595,258 | 8/1926 | Stebbins | 209/144 |
|---|---|---|---|
| 2,118,803 | 5/1938 | Bowen | 55/459 B X |
| 2,338,779 | 1/1944 | Mutch | 55/459 R X |
| 4,080,186 | 3/1978 | Ockert | 55/459 R X |

FOREIGN PATENT DOCUMENTS

| 22549 | 7/1936 | Australia | 55/459 D |
|---|---|---|---|
| 77364 | 1/1962 | France | 55/459 R |
| 8134 | 12/1976 | United Kingdom | 55/456 |
| 117167 | 1/1959 | U.S.S.R. | 210/512 R |
| 414004 | 9/1974 | U.S.S.R. | 209/144 |

OTHER PUBLICATIONS

First, M. W., et al. *Factors in the Design of Cyclone Dust Collectors,* In Heating & Ventilating's Ref. Sec., Jul. 1948.
Sears, F. W. et al., *College Physics,* 3rd ed., Mass., Addison-Wesley Publishing Co., Inc., 1960, pp. 80–81, 238, 269, 282.

*Primary Examiner*—Kathleen J. Prunner
*Attorney, Agent, or Firm*—Phillips, Moore, Lempio & Finley

[57] ABSTRACT

A centrifugal separator for the separation of the liquid and gaseous phases of a mixture thereof, which separator has an upwardly diverging vortex section with a relatively small diameter inlet to produce a high centrifugal acceleration and a relatively large diameter outlet to produce a low vertical throughput velocity thereat to minimize reentrainment of the separated liquid back into the gaseous phase. The vortex section is preferably hyperbolically shaped to maximize the overall efficiency of the separator. An annular discharge lip extends outwardly from and then downwardly relative to the vortex section outlet for the discharge of separated liquid from the vortex section.

10 Claims, 7 Drawing Figures

FIG_3

FIG_4

DIVERGING VORTEX SEPARATOR

BACKGROUND OF THE INVENTION

This invention relates to centrifugal separators used for the separation of the liquid and gaseous phases of a mixture thereof.

Many processes require the separation of a liquid from its own vapor or from a gas of nearly the same molecular weight. For example, a geothermal well may produce a mixture of steam and a highly saline geothermal brine at a high temperature and pressure and at a relatively high rate of flow. In order to obtain clean, dry steam for power generation and to enable recovery of the minerals dissolved in the brine, the two phases of the produced mixture must be separated from each other.

Although various types of separators have been designed, those chiefly used for this purpose achieve their results through gravitational separation of the two phases. Gravitational separation can occur if the mixture is confined under nearly static flow conditions for a sufficient time to allow the liquid phase to settle out of the mixture. Separators of this type are not useful, however, in the handling of high rates of flow because of the extremely large vessels that would be required to provide the necessary residence time for such separation.

In order to handle high rates of flow, centrifugal, or cyclone, separators are used to cause the fluid mixture to move in a helical path so that gravitational separation is accomplished by outward migration of the liquid particles from the axis of the helix. Typically, such separators comprise a vertical cylinder in which the fluid is introduced tangentially at the lower end of the cylinder, with the gaseous phase being removed from the upper end of the cylinder. The curvature of the cylinder wall forces the incoming fluid into a vortex field with a high centrifugal acceleration, and the gas and entrained liquid will then move helically up the cylinder towards the gaseous phase outlet, with the entrained liquid gravitating outwardly to the cylinder wall to collect thereon during such fluid movement. The gas, with whatever liquid portions that have not been separated therefrom, will then exit the separator from the upper outlet.

The separated water in the separator will also be urged to flow helically upwardly therein, due to the tangential and vertical components of velocity resulting from the centrifugal acceleration and vertical movement of the fluid through the separation. Although centrifugal separators have been designed to remove the upwardly flowing collected liquid from a liquid outlet above the fluid inlet, e.g. U.S. Pat. No. 3,488,924, the typical commercially used separator utilizes a bottom outlet, which will allow removal of the collected liquid after the liquid has accumulated on the separator wall to the extent that its mass will cause downward drainage of the separated liquid.

Ideally, a separator should provide a complete separation between the two phases and cause no loss of pressure in the fluid flowing through the system. Such ideal, of course, cannot be achieved in the design of a centrifugal separator. The separator must allow sufficient residence time to provide a long enough helical flow path of the fluid for the liquid phase to separate from the gaseous phase. An increase in the length of the flow path will increase, proportionately, the pressure drop of the fluid through the flow path. The efficiency of separation can be increased by increasing the centrifugal acceleration of the fluid. However, this will likewise increase the velocity of the fluid as it moves through the flow path, and the pressure drop will increase proportionately to the square of this velocity.

Thus, in the design of a conventional centrifugal separator, the diameter of the separator represents a compromise between conflicting considerations. The smaller diameter, the greater will be the centrifugal acceleration and separation efficiency, but also the pressure drop through the system will increase. The pressure drop can be reduced by increasing the diameter, but, by so doing, the separation efficiency will decrease.

Another problem encountered in the operation of centrifugal separators, and particularly involving the separation of a liquid from its own vapor, is that of reentrainment of the separated liquid back into the vapor. The liquid phase, of course, shows a tendency to adhere to the separator wall in preference to the accompanying vapor phase. If the relative velocity between the separated liquid phase and vapor phase at the interface thereof is sufficiently low, there will be little, if any, reentrainment of the separated liquid back into the vapor phase. However, if such relative velocity increases, then the degree of reentrainment will also increase. Since the separated liquid and vapor outlets must be spaced physically apart there will be a difference in the directions of flow of the separated liquid and vapor at their interface which will cause unwanted reentrainment thereat.

Another aspect of the reentrainment problem is that the separated liquid will have a high component of vertical velocity imparted thereto which will cause the liquid to climb completely up the separator wall. Typically, the vapor outlet will be formed by a tubing which extends through the dome or wall of the separator and has an opening inside the separator from which the vapor can exit. Some of the climbing liquid will also flow along such tubing to the opening thereof and be aspirated back into the exiting vapor. If the vapor outlet is not located centrally in the dome, the climbing liquid will accumulate thereat until it has sufficient mass to drop back down into the swirling vapor phase and be reentrained therein.

A still further problem of conventional centrifugal separators is encountered in a steam-brine separator process when the liquid phase has a high concentration of total dissolved solids. Any surface of the separator that is wetted by the separated liquid must be kept sufficiently wetted so that the solids will remain in solution, not scale out in the separator wall, nor be dehydrated by exposure to the vapor.

SUMMARY OF THE INVENTION

The present invention is directed at reducing or eliminating one or more of the problem set forth above.

In one aspect of the invention, a separator is provided having an upwardly diverging vortex section with a lower inlet thereto and an upper therefrom, with means to introduce a mixture of liquid and gaseous phases into the vortex inlet so that the gaseous phase and the separated liquid phase travel co-currently and helically up the vortex section, the gaseous phase then traveling upwardly from the vortex outlet to a gas outlet thereabove and the separated liquid then traveling outwardly from the vortex outlet to a liquid collector surrounding the vortex outlet.

Another aspect of the invention is that the vortex inlet and outlet are substantially different in diameter, thus enabling a high centrifugal acceleraion of the fluid to be developed at the relatively small diameter vortex inlet, and with the gaseous phase and the separated liquid phase both having a low component of vertical velocity at the relatively large diameter vortex outlet.

A still further aspect of the invention is that the vortex section has a substantially hyperbolic shape between the inlet and outlet thereof.

A yet further aspect of the invention is that the vortex section is shaped between the inlet and outlet thereof in general conformity with the equation $hd = a$, wherein d is the diameter of the vortex section at any point thereon, h is the vertical distance from such point to a horizontal asymptote thereabove of the equation $hd = a$, and a is a constant.

Another aspect of the invention is that the outlet of the vortex section has an outwardly and then downwardly extending discharge lip therearound to remove the separated liquid from the outlet of the vortex section.

Further aspects of the invention will be set forth in more detail in the course of the following description.

BRIEF DESCRIPTION OF THE DRAWINGS

In the drawings, forming a part of this application and in which like parts are designated by like reference numerals throughout the same.

DESCRIPTION OF THE PREFERRED EMBODIMENT

Figures 1, 1A, 2:
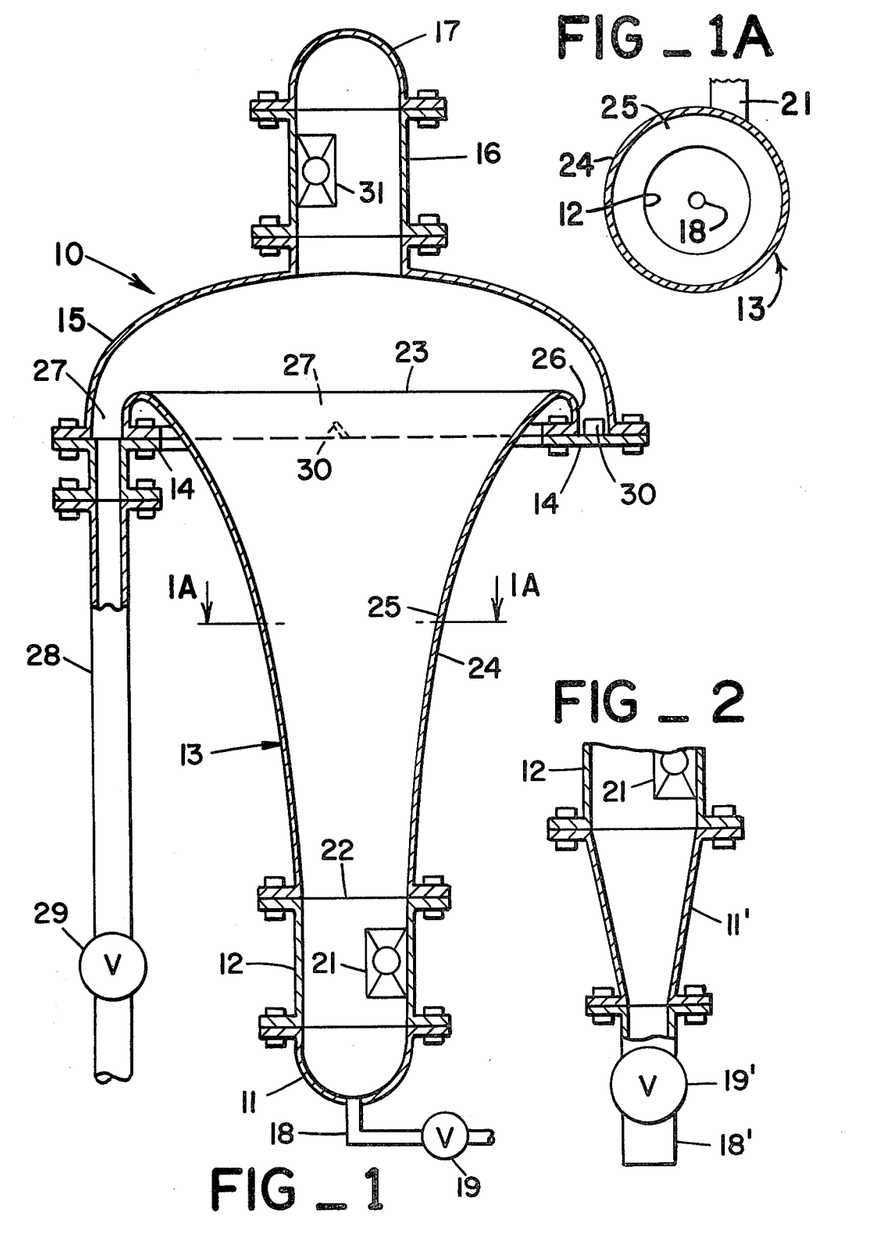
FIG. 1 is a vertical, cross-sectional view of a separator constructed in accordance with the invention.
FIG. 1A is a horizontal, cross-sectional view of the separator of FIG. 1, taken on line 1A—1A thereof.
FIG. 2 is a vertical cross-sectional view of an alternate form of bottom closure for the separator of FIG. 1.

Referring now to FIG. 1, the separator 10 of the present invention comprises, from the bottom up, a bottom closure 11, a tangential inlet section 12, a diverging vortex section 13, a bridge ring 14, a gas dome 15, an outlet section 16 and a top closure 17, all bolted together as shown.

The bottom closure 11 has a typical small diameter outlet pipe 18 normally closed by valve 19, for use in flushing the interior of the separator during periodic maintenance. If the separator should be used in an application wherein the entering flow contains a solid phase in conjunction with the liquid and vapor phases, then it would be advantageous to instead use a conical bottom closure 11' as illustrated in FIG. 2, which will enable intermittent or continuous outflow of separated solid phase through discharge pipe 18' and valve 19'.

The tangential inlet section has a conventional duct 21 integral therewith for connection to the pipe system (not shown) through which the fluid to be separated is flowing, so that such fluid may be discharged into the separator 10 tangentially thereof.

The diverging vortex section 13 has a relatively small diameter lower inlet 22, equal in diameter to that of the tangential inlet section 12, and a relatively large diameter outlet 23. The vortex section wall 24 is symmetrical about the vertical axis of the vortex section so that the vertically continuous inner surface 25 of the vortex wall has a circular configuration, in a plane normal to the vertical axis, throughout its height from the inlet to the outlet thereof. The shape of the vortex section wall, in a vertical plane which includes the vertical axis of the vortex section, i.e. the shape as seen in FIG. 1, is preferably hyperbolic, as described in more detail hereinafter. At the upper end of the vortex section, a discharge lip 26 extends annularly outwardly and then downwardly from the vortex section outlet 23.

The bridge ring 14 interconnects the discharge lip 26 and the gas dome 15 and forms therewith an upwardly-open collector trough 27 which surrounds the vortex outlet. One or more downcomer pipes 28 are connected to the collector trough 27 to discharge collected liquid therefrom through valve 29. The discharge lip 26, trough 27 and downcomer pipes 28 cooperate to provide a second outlet means surrounding the vortex section outlet 23 for discharging a separated liquid phase outwardly from the vortex section outlet. Vanes 30 may be disposed at suitable locations in trough 27 to retard movement of collected liquid along the length of the trough. The depth and width of the collector trough 27 may be increased, if desired, to handle greater proportions of liquid in the gas or to eliminate flash back of a thermodynamically saturated liquid to the vapor space thereabove.

The outlet section 16 has a conventional duct 31 integral therewith for connection of the separator to a pipe system so that the gas or vapor in the separator may be discharged into such system after separation of the liquid phase therefrom. The gas dome 15, outlet section 16, top closure 17, and duct 31 cooperate to provide a first outlet means above the vortex section outlet 23 for discharging the gaseous phase of a mixture from the separator 10. The top closure 17, outlet section 16 and gas dome 15 can be modified to increase or decrease the gas volume contained therein and thus change the residence time in the separator of the gas after liquid separation therefrom.

In operation, a mixture of liquid and gas enters the inlet duct 21 to the separator. In the case of a two phase, single component flow, the mixture will have thermodynamically saturated liquid and vapor, at a common temperature and pressure. Depending upon the immediate prior history of this flow, slip may or may not exist between the phases, slip being defined as the relative velocity between the vapor and liquid portions of the flow. Normally, the flow in the pipe system will be turbulent and well mixed, and consequently, in the absence of a flow-wise acceleration field, the slip ratio, i.e., the ratio of the vapor velocity to the liquid velocity, will be close to one.

The flow is introduced tangentially into the separator, whose principal, or vertical, axis is normal to the entering flow. Since the inlet section 12 is circular, and with a diameter equal to the inlet 22 of the vortex section, the fluid is forced into a vortex field with a degree of centrifugal acceleration dependent upon such diameter and the square of the incoming velocity.

The vapor phase will travel helically up within the vortex section and the separated liquid will accumulate on the inner vortex wall surface 25 and likewise travel helically up such surface. When the vapor phase reaches the vortex section outlet 23, it will continue upwardly into the gas dome 15 and then discharge from the outlet duct 31. The separated liquid, traveling upwardly and co-currently with the vapor phase, will discharge outwardly from the vortex section outlet 23 to the collector trough 27 and will be drained therefrom by downcomer 28.

Because of the centrifugal acceleration imparted to the entering fluid, the interface between the swirling separated liquid and the vapor will have the shape of a free vortex. The mathematical expression for the liquid-vapor interface of a liquid in a free vortex, and in a horizontal plane, is $$V_t d = k$$

wherein, $V_t$ is the tangential velocity, d is the diameter of the liquid-vapor interface and k is the vortex constant.

In a true vortex, there is no vertical movement of the fluid once the vortex field has been established. In the present instance, with fluid continuously flowing through the separator, there is movement of the fluid both tangentially and parallel to the vortex axis. The equivalent mathematical expression for the shape, in a vertical plane, of the liquid-vapor interface in a vortex field wherein there is an upward climb of fluid by an equal amount for each revolution about the vortex axis, is:

$$hd = a$$

wherein h and d are the height and diameter at any point on the liquid-vapor interface and a is the vortex form constant.

The general equation for an equilateral hyperbola, with the center as origin and with the x and y coordinate axes as the asymptotes of the hyperbola, is:

$$xy = c^2/2$$

(c being a constant). Since c in such general equation is a constant, any given value of c will give a particular value to $c^2/2$ which will then determine the particular shape of the hyperbola. As a consequence, the shape of the liquid-vapor interface in the vortex field is hyperbolic with the vertical and horizontal axes being asymptotic thereto.

Accordingly, if the inner surface 25 of the vortex section wall 24 is shaped hyperbolically, and with the proper vortex form constant, then it will provide an outer boundary surface for the separated liquid which will be nearly uniformly spaced from the natural liquid-vapor interface, i.e., the separator wall will have a nearly uniform thickness of separated liquid thereon throughout the height of the vortex section.

Figures 3, 4:
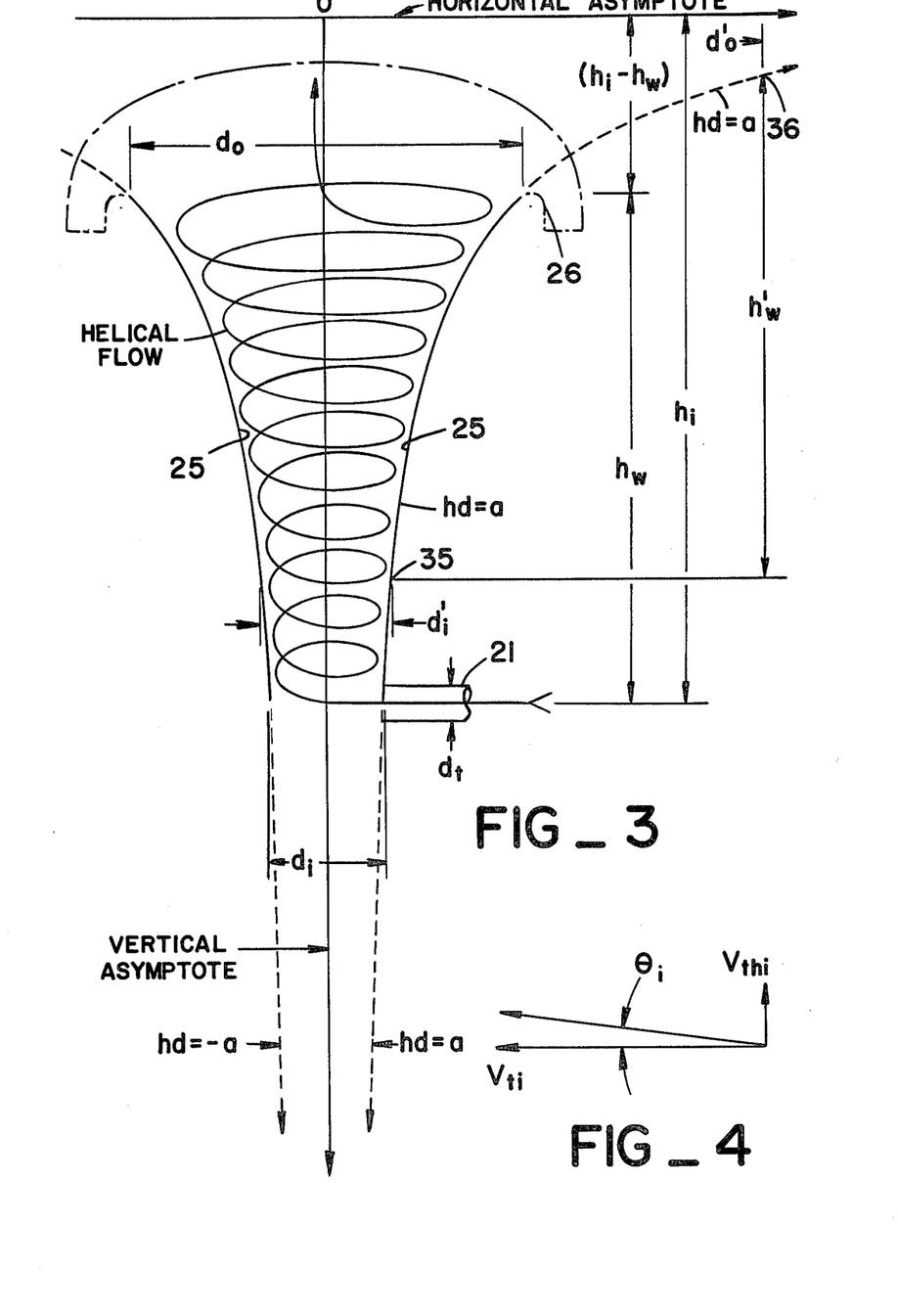
FIG. 3 is a diagram illustrating a manner in which the shape of the vortex section of the separator may be determined.
FIG. 4 is a diagram of the velocity components of the fluid at the inlet of the vortex section.

FIGS. 3 and 4 illustrates the manner in which the shape of the inner surface wall 25 of the vortex section 13 of the separator 10 may be determined. In FIG. 3, the horizontal d axis and vertical h axis (which intersect at origin O) are the horizontal and vertical asymptotes for the hyperbola hd=a and its conjugate hd=−a with the inner surface 25 of the vortex section wall, shown in solid lines, being a portion of the hd=a and hd=−a curves.

The shape of the hyperbolically curved wall, of course, will vary in accordance with the particular value of the vortex form constant a, and thus the value for this constant must be determined. Likewise, the shape of the separator will vary for any given value of the vortex form constant, depending upon what portion of the hyperbolic curve is to be used. For example, if the portion of the hd=a curve between points 35 and 36 thereon were used as the shape of the vortex wall, the wall would have the same wetted height h'w, the inlet diameter at point 35, $d'_i$, would be but slightly greater, but the outlet diameter, $d'_o$, at point 36 would be doubled, all with respect to the wetted height $h_w$ and inlet and outlet diameters $d_i$ and $d_o$ of the solid line portion 25 of the hd=a curve shown in FIG. 3.

The following sets forth the manner in which the vortex form constant a and the particular portion of the resultant curve hd=a to be used are determined. The symbols used in this analysis are defined as:

a = vortex form constant
$d_i$ = diameter of separator at inlet 22
$d_o$ = diameter of separator at outlet 23
$d_t$ = equivalent diameter of tangential inlet duct 21 into separator
$g_a$ = centrifugal acceleration
g = standard gravitational field
GR = $g_a$/g
$h_i$ = distance from separator inlet to horizontal asymptote
$h_w$ = height of wetted separator surface 25
$N_s$ = number of turns of helical flow of fluid through the separator between the inlet and outlet thereof
$V_{ti}$ = tangential component of fluid velocity at inlet
$V_{to}$ = tangential component of fluid velocity at outlet
$V_{thi}$ = vertical (throughput) component of fluid velocity at inlet
$V_{tho}$ = vertical (throughput) component of fluid velocity at outlet
$V_{ri}$ = resultant velocity of fluid at inlet
w = weight of fluid throughput per unit time
$\pi$ = ratio of circumference to diameter
$\rho$ = density of fluid in system
$\theta i$ = angle from horizontal of resultant fluid flow at inlet The velocity of the fluid entering the separator inlet from the tangential and horizontal inlet duct is:

$$V_{ti} = \frac{w}{\rho \pi (d_t)^2/4} \quad (1)$$

The centrifugal acceleration of the fluid entering the separator is:

$$g_a = \frac{2(V_{ti})^2}{d_i} \quad (2)$$

Since GR = $g_a$/g, then $$d_i = \frac{2(V_{ti})^2}{GR \, g} \quad (3)$$

Since all of the fluid entering the separator must flow upwardly, the vertical throughput velocity of the fluid at the inlet is:

$$V_{thi} = \frac{w}{\rho\pi(d_i)^2/4} \quad (4)$$

Because of the vertical and horizontal components of velocity of the fluid in the separator, the fluid will flow helically up the separator. At the inlet, the angle $\theta_i$ (FIG. 4) from horizontal of the resultant helical flow is found as follows:

$$\cot \theta_i = \frac{V_{ti}}{V_{thi}} \quad (5)$$

Substituting the value for $V_{ti}$ and $V_{thi}$ found in equations (1) and (4), $$\cot \theta_i = \left(\frac{d_i}{d_t}\right)^2 \quad (6)$$

At the outlet 23 of the vortex section, the following conditions exist:

$$V_{tho} = \frac{w}{\rho\pi(d_o)^2/4} \quad (7)$$

$$d_o = \sqrt{\frac{4w}{\rho\pi V_{tho}}} \quad (8)$$

$$V_{to} = V_{ti}\left(\frac{d_i}{d_o}\right) \quad (9)$$

Since the vortex section wall 24 is to have a hyperbolic shape:

$$h_i d_i = a \quad (10)$$

$$(h_i - h_w) d_o = a \quad (11)$$

Consequently:

$$h_i = \frac{h_w}{1 - (d_i/d_o)} \quad (12)$$

and $$a = \frac{h_w d_i}{1 - (d_i/d_o)} \quad (13)$$

The fluid in the vortex section will flow upwardly, as if in an even expanding helical pipe coil, with the number of turns of the pipe helix, $N_s$, being related to the diameter of the separator at the inlet, the height of the wetted surface and the velocity angle at the inlet as follows:

$$N_s = \frac{h_w \cot \theta_i}{\pi d_i} \quad (14)$$

$$h_w = \frac{\pi N_s d_i}{\cot \theta_i} \quad (15)$$

Substituting the value of $h_w$ found in equation (15) into equation (13)

$$a = \left(\frac{\pi N_s d_i}{\cot \theta_i}\right)\left(\frac{d_i}{1 - (d_i/d_o)}\right) \quad (16)$$

Substituting the value of $\cot \theta_i$ from equation (6) into equation (16), $$a = \frac{\pi N_s(d_i)^2}{1 - (d_i/d_o)} \quad (17)$$

Then, using the values of $d_t$, $d_i$ and $d_o$ from equations (1), (3) and (8), $$a = \frac{4N_s w}{\rho V_{ti}\left(1 - \frac{2(V_{ti})^2}{GR\, g\sqrt{\frac{4w}{\rho\pi V_{tho}}}}\right)} \quad (18)$$

To illustrate the manner in which a separator would be designed for a particular application, assume that 17,000 pounds per hour of 20% quality by weight steam and brine, at a temperature of 400° F. and pressure of 250 psia, is flowing into the separator through an inlet pipe having a diameter of four inches. Inlet duct 21 should have the same cross-sectional area so that any inlet pressure drop will be negligible.

In such case:
w = 4.72 lb/sec (4.72 lb/sec = 17,000 lb/hour)
$\rho$ = 0.5367 lb/ft³ (at 400° F.)
g = 32.2 ft/sec²

From equation (1), the tangential velocity at the inlet, $V_{ti}$, will be 100.78 ft/sec.

For efficient separation, a gravitational ratio in the order of 500–700 should be used. If the gravitational ratio is too low, the efficiency of separation of the the brine particles from the steam will be too low. If too high, the pressure drop of the steam between the inlet and outlet (which is a function of the square of the tangential velocity) will be too great. For the purposes of the present illustration, let us assume that a gravitational ratio of 621 is desired.

From equation (3), the diameter of the separator at the inlet thereof should accordingly be equal to 1.016 foot.

It is generally accepted that when a stream of steam is flowing across a surface of water, the water will not reentrain into the steam if the relative velocity between the steam and water at the interface thereof is about, or in the order of, 1 ft/sec or less. At the outlet of the vortex section the tangential components of velocity of the steam and separated water will be substantially the same. The separated water will be flowing tangentially outwardly over the outlet lip 26 of the separator with no upward component of velocity, while the steam will have an upward component of velocity equal to its throughput velocity at that point. Accordingly, to prevent reentrainment, the throughput velocity, $V_{tho}$, of the steam at the outlet should be 1 ft/sec or less. Let us assume that the vortex section is to be designed so that $V_{tho}$ is equal to 1 ft/sec.

Accordingly, from equation (8), the diameter of the vortex section at the outlet thereof, $d_o$, should be 3.35 feet.

From equation (18), the vortex form constant a for the vortex section can now be expressed as:

$a = 0.5012 N_s$.

The value of $N_s$, i.e., the number of turns of the helix of the flow path of the fluid as the fluid flows upwardly through the vortex section, that is to be used should be selected to give optimum overall results. The number of turns will determine the length of the flow path of the fluid through the vortex section and the residence time of the fluid in the vortex section. The longer the time that the fluid is in such sections, the greater will be the efficiency of separation of the brine from the steam. However, the longer the flow path, the greater will be the pressure drop of the fluid through the system. Thus, the number of turns should be chosen to given an efficient separation but without an undue pressure drop. As is apparent, there is no critical value to use, but typically the number of turns through the separator should be in the range from 5 to 15 turns to give an acceptable compromise between separation efficiency and pressure drop.

In the present illustration, let us assume that it is desired to have 11.5 turns of the flow path. With this value now chosen, the vortex form constant can now be calculated from $a = 0.5012 N_s$, and $a$ is now found to equal 5.76. With the vortex form constant now known, the particular curve hd=5.76 can now be drawn relative to the h and d coordinate axes, as in FIG. 3. Since the diameter of the vortex section separator at the inlet and outlet have been determined to be 1.016 and 3.35 feet, respectively, these two points on the curve will enable the height of the wetted surface of the vortex section to be found, as measured along the h axis.

Analytically, the height of the wetted surface, $h_w$, can be found by use of equation (10) and (11), wherein $$h_i = \frac{a}{d_i} = \frac{5.76}{1.016} = 5.67$$

$$(h_i - h_w) = \frac{a}{d_o} = \frac{5.76}{3.35} = 1.72 \text{ feet}$$

With these values now known, the height of the wetted surface, $h_w$, can be found by subtracting $(h_i - h_w)$ from $h_i$, with $h_w$ then being equal to 3.95 feet.

As is apparent, the values of $d_i$, $d_o$ and $h_w$ determine the portion of the hd=a curve which is to be selected as the shape of the inner surface 25 of the vortex section 13.

Thus, for the particular brine flowing through the particular inlet pipe at a rate of 17,000 pounds per hour, the vortex section of the separator should have an inlet diameter of 1.016 foot, an outlet diameter of 3.35 feet and a height of 3.95 feet, with hyperbolic walls satisfying the equation hd=5.76, wherein d is the diameter of the inner surface 25 of the vortex section at any point and h is the vertical distance of such point from the horizontal asymptote of the equation.

The pressure drop of the steam through the vortex section can be determined by use of one form of Moody's equation:

$$\Delta P = 4 f \rho \left(\frac{L}{D_{eq}}\right)\left(\frac{V^2}{2g}\right) \tag{19}$$

wherein
 $\Delta P$ = pressure drop
 f = friction factor
 $\rho$ = density of the fluid
 L = length of the fluid flow path
 $D_{eq}$ = equivalent diameter of the flow path
 V = velocity of flow
 g = gravitational constant A stepwise solution of this equation for the 11.5 turns of the flow helix indicates that the pressure drop in the vortex sector is approximately ½ psi.

To this loss whould be added the steam exit loss from the outlet 31 or the separator dome, namely:

$$P_e = C(V_e)^2 \tag{20}$$

wherein
 $P_e$ = exit pressure drop
 C = constant (depending upon exit geometry)
 $V_e$ = exit velocity With conventional design of the steam exit, the exit pressure drop whould be in the order of ½ psi. Hence, the total pressure loss of the steam through the separator will be in the order of 1 psi, or about 0.4% of the 250 psia of the steam at the inlet.

As is apparent, the vortex section 13 of separator 10 should be designed for a particular use, since the preferred shape will depend upon the existing conditions. Typically, a process will have a relatively constant flow through a conduit system having a fixed cross-sectional area (usually circular in shape). Assuming that the conduit system discharges directly into the separator inlet duct 21 process will determine the values of w, $\rho$ and $V_{ti}$ to be used to the design of the vortex section.

In general, the inlet diameter of the vortex section will be chosen to provide the desired gravitational ratio, GR, so that efficient separation will result. The outlet diameter of the vortex section is chosen so that the vertical throughput velocity component, $V_{tho}$, of the vapor portion of the mixture is less or equal to about one foot per second at the outlet to prevent reentrainment of the separated liquid. The number of turns, $N_s$, of the helix is chosen to give the best compromise between a high separation efficiency and a low pressure drop through the separator.

With these values, the vortex form constant, a, can then be calculated, such form constant then determining the height of the vortex section between the inlet and outlet and the particular hyperbolic curve and portion thereof to which the separator wall should conform.

Figure 5:
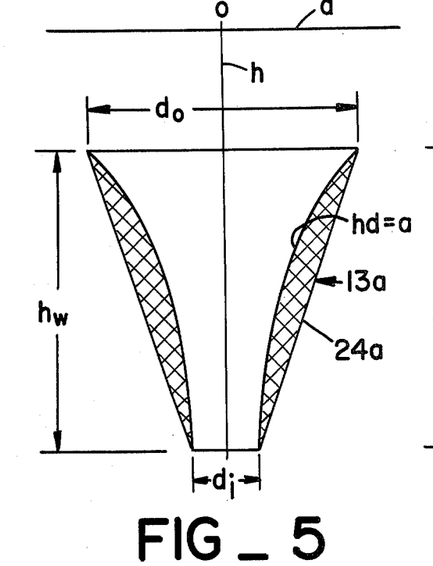
FIGS. 5 and 6 are diagrams illustrating the effects of having a vortex shape which differs from the natural hyperbolic shape of the liquid-gas interface.

FIG. 5 illustrates the operation of a separator having a vortex section 13a with a shape other than as found by the preceding analysis. Suppose that the inlet and outlet diameters, $d_i$, and $d_o$, and the height, $h_w$, have been determined as above, but that the vortex section has a straight tapered wall 24a between the inlet and outlet. Such diverging vortex section 13a will provide the same desired initial centrifugal acceleration and the same number of helical turns as before. Also, with the same outlet diameter as before, the vertical throughput velocity component of the vapor phase will be equal to 1 foot per second so that there is the desired low relative velocity of the vapor and separated liquid to prevent reentrainment at the outlet of the vortex section.

However, in continual operation, the separated water flowing helically up the vortex section wall will build up thereon, as shown by the cross-hatching in FIG. 4, so that the interface between the liquid and vapor phases will have the natural hyperbolic shape determined by the various parameters of the system.

This accumulation of liquid increases the energy required to drive the liquid upwardly to the outlet. Since the only source of energy available is from the incoming fluid, the energy used to drive the accumulated liquid will cause an undesirable increase of the pressure drop of the vapor through the vortex section. Further, if the shape of the vortex section allows too much liquid to accumulate, the mass of the liquid can cause liquid to gradually flow down the separator wall and collect in the bottom of the separator so that the incoming mixture must bubble through the collected liquid, thus causing the separation efficiency of the device to decrease drastically.

Figure 6:
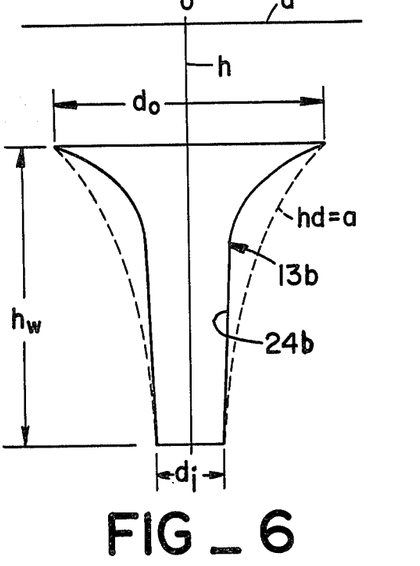

FIG. 6 illustrates a vortex section 136 having the same inlet and outlet diameter and height but with a vortex wall 24b within the shape of the natural hyperbolic vapor-liquid interface. Again, the relatively large diameter vortex outlet will provide the desired reduction of the throughput velocity component of the vapor at the outlet to prevent reentrainment, but again the pressure loss is increased. In this case, the helical flow of fluid up through the vortex section is more tightly confined throughout most of the height of the section so that the average diameter of the vortex section is lessened. As a result of this, the average velocity of the vapor will be increased as it travels up the vortex section, as compared with a separator with a vortex section having a wall corresponding to the natural hyperbolic vapor-liquid interface. As seen from equation (19), the pressure drop is a function of the square of the velocity, and thus will be undesirably high.

From the foregoing, it is apparent that if the wall of the vortex section conforms to the natural vapor-liquid interface, the separated liquid will be of uniform thickness on the vortex section wall and the pressure drop of the vapor through the system will be minimized.

Figure 7:
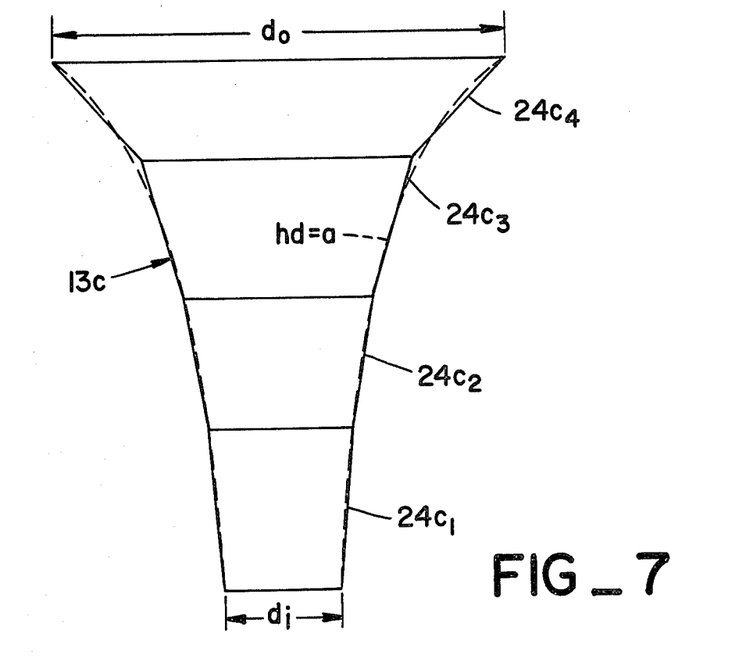
FIG. 7 is a simplified illustration of an alternative manner in which the vortex section of the separation may be constructed.

Manufacturing considerations may dictate that the vortex section 13 be made up of a plurality of straight tapered portions, as illustrated at 13c in FIG. 7, wherein four such sections 24c1, 24c2, 24c3 and 24c4 are shown. As set forth above, deviations of the diameter of the vortex wall from the natural hyperbolic vapor-liquid interface will cause an increase in pressure drop of the vapor through the system, but the costs saved in the manufacture of straight tapered portions may offset the operational losses from the increased pressure drop through the vortex section. The closer the vortex wall section is to the natural hyperbolic interface, the more efficient the system.

Removal of the separated liquid from the system utilizes the Coanda effect, wherein a particularly shaped lip can be constructed so that a high velocity flow or sheet of fluid discharging over the lip can be caused to bend with the lip through an arc of 180 degrees.

In the present separator the outlet end of the vortex section has a rounded discharge lip 26 extending outwardly from the upper end of the vortex wall 24 and then downwardly. Although in the particularly described separator the vertical throughput velocity component of the fluid at the outlet is approximately one foot per second, the tangential velocity component will be equal to $V_{ti}(d_i/d_o)$, or about 30 feet per second, and the liquid will be discharged tangentially outwardly over the lip at this velocity. The outflowing liquid will be led by the discharge lip downwardly, i.e. in a direction opposite to the prime bulk flow and flow of the now remaining vapor phase at the vortex section outlet, into the annular collector trough 27, for removal through a suitable number of downcomer pipes 28.

The separated liquid will flow around the collector trough as a result of the tangential velocity which such liquid had as it left the outlet of the vortex section. However, since such fluid had but little component of upward velocity at the large diameter outlet of the vortex section there will be insufficient energy in the circulating water to cause it to swirl up the separator dome and climb towards the vapor outlet. If desired, baffles 30 may be mounted in the collector trough so that the velocity of the circulating water therein is slowed to further insure that none of the separated water will climb the separator dome 15.

I claim:

1. A separator for separating the liquid and gaseous phases of a fluid mixture thereof comprising:

a vertical and upwardly diverging vortex section having a lower inlet, an upper outlet, and a vertically-continuous inner surface between said inlet and said outlet which is circular in configuration normal to the vertical axis of said vortex section throughout its height and which expands substantially hyperbolically, means for introducing said fluid mixture into said inlet of said vortex section with a substantial component of tangential velocity, first outlet means above said outlet of said vortex section for discharging the gaseous phase of said mixture from said separator, second outlet means surrounding said outlet of said vortex section for discharging the separated liquid phase outwardly from said outlet of said vortex section.

2. A separator as set forth in claim 1 wherein said inner surface of said vortex section conforms substantially to a selected portion of the curve defined by the equation $hd = a$, said curve having a horizontal asymptote, wherein d is the diameter of said inner surface of said vortex section at any point thereon, wherein h is the vertical distance from such point to said horizontal asymptote, and wherein a is a vortex form constant.

3. A separator for separating the liquid and gaseous phases of a fluid mixture thereof, said mixture having a flow rate, w, in weight per unit time and a density, p, in mass per unit volume, said separator comprising:

a vertical and upwardly diverging vortex section having a lower inlet, an upper outlet and a vertically continuous inner surface between said inlet and said outlet which is circular in configuration normal to the vertical axis of said vortex section throughout its height and which expands substantially hyperbolically upwardly, said vortex section having a height between said inlet and said outlet thereof such that the number of complete revolutions, $N_s$, of the mixture traveling helically up said vortex section is between 5 and 15, means for introducing said fluid mixture into said inlet of said vortex section with a substantial component of tangential velocity, $V_{ti}$, said inlet of said vortex section having a diameter such that the ratio, GR, of centrifugal acceleration of said mixture at said inlet to the standard gravitational field, g, is greater than 500, said outlet of said vortex section having a diameter such that the vertical component, $V_{tho}$, of the velocity of the gaseous phase of said mixture at said outlet of said vortex section is less or equal to about one foot per second, first outlet means above said outlet of said vortex section for discharging the gaseous phase of said mixture from said separator, second outlet means surrounding said outlet of said vortex section for discharging the separated liquid phase outwardly from said outlet of said vortex section.

4. A separator as set forth in claim 3, wherein said inner surface of said vortex section conforms substantially to a selected portion of the curve defined by the equation $hd=a$, said curve having a horizontal asymptote, wherein d is the diameter of said inner surface of said vortex section at any point thereon, wherein h is the vertical distance from such point to said horizontal asymptote, and wherein a is a vortex form constant.

5. A separator as set forth in claim 4, wherein:

$$a = \frac{4N_s w}{\rho V_{ti} \left(1 - \frac{2(V_{ti})^2}{GR\, g \sqrt{\frac{4w}{\rho \pi V_{tho}}}}\right)}$$

6. A separator as set forth in claim 5 wherein said second outlet means includes an annular discharge lip extending outwardly from said outlet of said vortex section and then downwardly relative thereto.

7. A separator as set forth in claim 5 wherein said first outlet means includes a dome above said outlet of said vortex section, said dome extending downwardly below and spaced outwardly from said outlet of said vortex section, and wherein said second outlet means includes an annular discharge lip extending outwardly from said outlet of said vortex section and then downwardly relative thereto, and a bridge ring extending between said discharge lip and said dome to form therewith an annular collector trough surrounding and below said outlet of said vortex section.

8. A method of separating the liquid and gaseous phases of fluid mixture thereof utilizing a separator having a vertical vortex section with a lower inlet and an upper outlet and a vertically continuous inner surface between said inlet and outlet which is circular in configuration normal to the vertical axis of said vortex section throughout its height, the method comprising:

introducing said mixture into said inlet with a component of tangential velocity, $V_{ti}$ such that the ratio, GR, of centrifugal acceleration of said mixture at said inlet to the standard gravitational field, g, is greater than 500, confining said mixture by said vortex section for free upward travel of said mixture through a helical path within said vortex section from said inlet to said outlet, said helical path between said inlet and said outlet having a number of complete revolutions, $N_s$, between 5 and 15, expanding the diameter of said helical path substantially hyperbolically in the direction of flow and from said inlet to said outlet such that the vertical component, $V_{tho}$, of the velocity of the gaseous phase of said mixture at said outlet is less or equal to about one foot per second, removing the separated liquid phase of said mixture outwardly from said outlet of said vortex section, removing the gaseous phase of said mixture upwardly from said outlet of said vortex section.

9. The method as set forth in claim 8 wherein the diameter of said helical path is expanded substantially hyperbolically upwardly in substantial conformance to a selected portion of the curve defined by the equation $hd=a$, said curve having a horizontal asymptote, wherein d is the diameter of said path at any point thereon, wherein h is the vertical distance from such point to said horizontal asymptote, and wherein a is a vortex form constant.

10. The method as set forth in claim 9 wherein:

$$a = \frac{4N_s w}{\rho V_{ti} \left(1 - \frac{2(V_{ti})^2}{GR\, g \sqrt{\frac{4w}{\rho \pi V_{tho}}}}\right)}$$

in which:

w = flow rate of said mixture, in weight per unit time
$\rho$ = density of said mixture, in mass per unit volume.

* * * * *

UNITED STATES PATENT AND TRADEMARK OFFICE
CERTIFICATE OF CORRECTION

PATENT NO. : 4,394,138
DATED : July 19, 1983
INVENTOR(S) : John R. Schilling

It is certified that error appears in the above—identified patent and that said Letters Patent is hereby corrected as shown below:

Column 2, twelth line
    from the bottom - "problem" should read --problems--;

Signed and Sealed this

Twenty-fourth Day of January 1984

[SEAL]

Attest:

GERALD J. MOSSINGHOFF

Attesting Officer     Commissioner of Patents and Trademarks